(12) United States Patent
Schröder

(10) Patent No.: US 6,871,529 B2
(45) Date of Patent: Mar. 29, 2005

(54) THROTTLE VALVE ADJUSTMENT UNIT

(75) Inventor: Thomas Schröder, Hohenbergersteig (DE)

(73) Assignee: Pieburg GmbH, Neuss (DE)

( * ) Notice: Subject to any disclaimer, the term of this patent is extended or adjusted under 35 U.S.C. 154(b) by 49 days.

(21) Appl. No.: 10/253,612

(22) Filed: Sep. 25, 2002

(65) Prior Publication Data

US 2003/0094038 A1 May 22, 2003

(30) Foreign Application Priority Data

Nov. 16, 2001 (DE) .......................................... 101 56 478

(51) Int. Cl.[7] .................................................. G01M 15/00
(52) U.S. Cl. ..................................................... 73/118.1
(58) Field of Search .............................. 73/116, 117.2, 73/117.3, 118.1, 118.2, 119 R

(56) References Cited

U.S. PATENT DOCUMENTS

| | | | |
|---|---|---|---|
| 5,271,269 A | * 12/1993 | Rilling et al. ............... | 73/118.1 |
| 5,462,026 A | * 10/1995 | Kumagai ..................... | 123/396 |
| 5,571,960 A | * 11/1996 | Tateishi et al. ............. | 73/118.2 |
| 5,672,818 A | * 9/1997 | Schaefer et al. ............ | 73/118.2 |
| 5,698,778 A | * 12/1997 | Ban et al. ................... | 73/118.1 |
| 5,736,635 A | * 4/1998 | Onodera ..................... | 73/118.2 |
| 5,738,072 A | * 4/1998 | Bolte et al. ................. | 123/399 |
| 6,109,240 A | * 8/2000 | Sato et al. .................. | 606/130 |
| 6,288,534 B1 | * 9/2001 | Starkweather et al. ..... | 324/207.2 |
| 6,364,284 B1 | * 4/2002 | Imada et al. ................ | 251/248 |
| 6,651,622 B2 | * 11/2003 | Yanagii ...................... | 123/399 |
| 6,701,892 B2 | * 3/2004 | Wayama et al. ............. | 123/399 |
| 2001/0037794 A1 | * 11/2001 | Wayama et al. ............. | 123/399 |
| 2002/0056478 A1 | * 5/2002 | Scholten et al. ............ | 137/554 |
| 2003/0089870 A1 | * 5/2003 | Borasch et al. ......... | 251/129.11 |

FOREIGN PATENT DOCUMENTS

DE     41 42 810 A 1     7/1992

* cited by examiner

*Primary Examiner*—Eric S. McCall
(74) *Attorney, Agent, or Firm*—Griffin & Szipl, P.C.

(57) ABSTRACT

A throttle flap adjustment unit having a throttle flap fastened to a throttle flap shaft. The throttle flap shaft is rotatably journaled in a throttle flap end pipe. A servomotor is provided for adjusting the throttle flap shaft and is connected to the throttle flap shaft by a drive. A sensor unit is provided for determining a position of the throttle flap shaft. A cover is provided to be fastened onto the throttle flap end pipe, wherein the servomotor is positioned in the cover and controllable over an electrical coupling element, wherein the servomotor (6) has a front portion (12) oriented toward the throttle flap end pipe and formed as an end plate (13) for the drive shaft of the servomotor. The end plate (13) also serves to center the servomotor (6) with respect to the throttle flap end pipe (4) and also to center the servomotor (6) in the cover (7).

5 Claims, 2 Drawing Sheets

THROTTLE VALVE ADJUSTMENT UNIT

FIELD OF THE INVENTION

The invention relates to a throttle valve adjustment unit, having a throttle flap fastened to a throttle flap shaft, wherein the throttle flap shaft is rotatably journaled in a throttle flap end cap, having a servomotor for adjusting the throttle flap shaft and connected to the throttle flap shaft by a drive, having a sensor unit for determining the adjustment position of the throttle flap shaft, and having a cover fastened to the throttle flap end cap, wherein the servomotor is provided with a cover and is controllable by an electric coupling element.

BACKGROUND OF THE INVENTION

One throttle flap adjustment unit is known from DE-A1-4142810. In this unit, the servomotor is premounted on the cover to be put on the throttle flap end cap. A precisely centered positioning of the cover on the throttle flap end cap is necessary for engagement of a drive shaft of the servomotor with the drive. Such a centering can only be achieved with difficulty in the prior throttle flap adjustment unit and requires difficult assembly.

It is therefore an object of the present invention to produce a throttle flap adjustment unit, which avoids the above-named disadvantages.

It is a further object of the invention to provide a throttle flap adjustment unit that is easy to assemble, with a minimum of labor.

It is a still further object of the invention to provide a throttle flap adjustment unit that allows a high degree of position fit of the servomotor and thereby also of the drive shaft and other drive elements with respect to the drive for adjusting the throttle flap shaft.

SUMMARY OF THE INVENTION

In accordance with the above objects, there is provided, a throttle flap adjustment unit, comprising (a) a throttle flap shaft, (b) a throttle flap fastened to the throttle flap shaft, (c) a throttle flap end cap in which the throttle flap shaft is rotatably journaled, (d) a servomotor arranged to adjust the throttle flap shaft and coupled to the throttle flap shaft by a drive, and having a drive shaft and a front portion formed as an end plate, (e) a sensor unit arranged to determine a position of the throttle flap shaft, and (f) a cover fastened onto the throttle flap end cap.

In further embodiment, the servomotor is positioned by means of connection elements.

In a still her embodiment, the sensor unit is positioned in the throttle flap end cap, and the end plate is provided with contact elements electrically connected with corresponding contact counterparts provided on the throttle flap end cap, so that an electrical connection is made between the servomotor and the sensor unit.

In yet another embodiment, one or both of (1) the contact elements and (2) the contact counterparts are friction fit into a shaft and are plastically deformed following axial positioning of the cover with the throttle flap end cap.

In short, the objects of the present invention are solved in that the servomotor has a front portion formed as an end shield for a drive shaft of the servomotor and oriented toward the throttle flap end cap. This front portion serves to center the servomotor with respect to the throttle flap end cap and also to center the servomotor in the cover. In this way, it is achieved that the drive shaft of the servomotor precisely engages the drive, and, at the same time, the cover can be brought onto the throttle flap end cap with a precise fit. The servomotor is thereby easily positioned in the cover by means of connection elements, such as, for example, screws, rivets, etc. In order to provide adjustment of the sensor unit in a simple manner on the open throttle flap end cap, it can be provided that the sensor unit be positioned on the throttle flap end cap, whereby the end shield of the servomotors is provided with contact elements that are connected to corresponding contact counterparts on the throttle flap end cap by means of a rigid connection such as by soldering, welding, gluing, etc. In this manner, a secure thermal and vibration insensitive electrical connection is achieved between the servomotor and the sensor unit. It is particularly advantageous, if the contact elements and/or the contact counterparts are friction fit in a shaft and elastically deformed in their axial positioning by the final assembly of the cover with the throttle flap end cap.

Further objects, features and advantages of the present invention will become apparent from the Detailed Disclosure of the Preferred Embodiments, which follows, when considered together with the attached Figures.

DETAILED DESCRIPTION OF THE INVENTION

Figure 1:
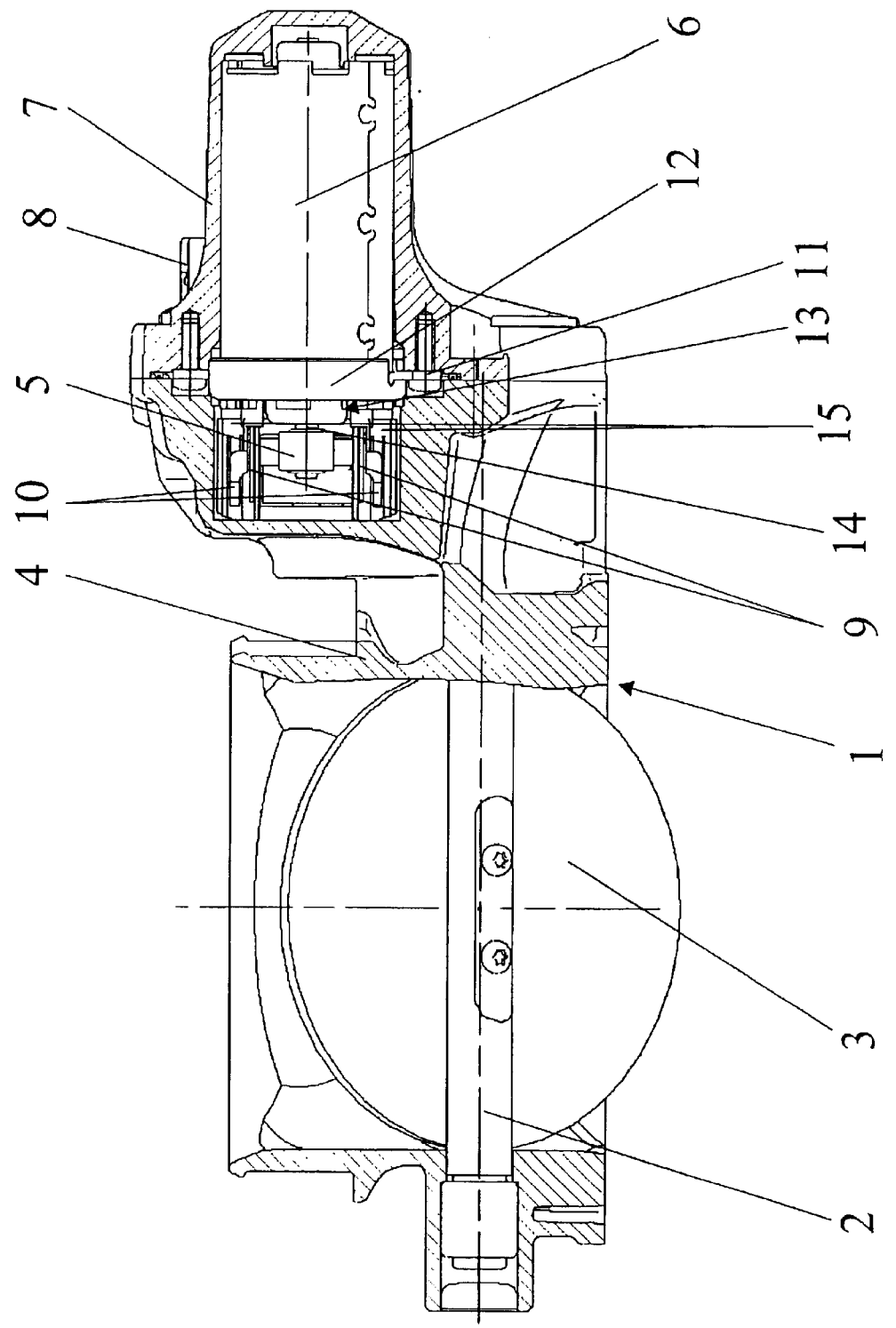
FIG. 1 is a sectional view of a throttle flap adjustment unit according to the present invention.

FIG. 1 shows a sectional view of a throttle flap adjustment unit 1 according to the present invention. The throttle flap adjustment unit has a throttle flap 3 fastened to a throttle flap shaft 2, wherein the throttle flap shaft 2 is rotatably journaled in a throttle flap end cap 4. In order to adjust the throttle flap shaft 2, it is connected to a servomotor 6 in a known manner by a drive, for example a gear drive, of which only a pinion 5 is shown. The servomotor 6 is arranged on a cover 7 to be fastened to the throttle flap end cap 4, and is controlled by a motor control device (not shown) to which it is connected by, for example, an electrical coupling element 8. Furthermore, the throttle flap adjustment unit 1 comprises, in a known manner, a sensor unit for determining the position of the throttle flap shaft 2, so that the position can be transmitted to the motor control device to allow, in this manner, precise control of the servomotor 6.

The sensor unit, a potentiometer, for example, can be disposed in the cover 7 as well as in the throttle flap end cap 4. In the first instance, the electrical connection can take place by strip conductors disposed in the cover. In this embodiment, the sensor unit is positioned in the throttle flap end cap 4, which has the advantage of more simple adjustment after assembly of the throttle flap shaft 2 with the throttle flap 3 in the throttle flap end cap 4. An electrical connection of the contact elements 9 of the servomotor 6 with the coupling element 8 is thereby achieved over contact counter elements 10 (see FIG. 2). The servomotor 6 is, at its end, connected to the cover 7 by means of screws 11. In order to allow a particularly simple and cost effective final assembly of the throttle flap adjustment unit 1, an end shield 13 for a drive shaft 14 serves as a front portion 12 sealing off the servomotor 6 on its inside, and, on its outside, serves as a centering portion for the servomotor 6 and thereby also for the cover 7 for assembly Onto the throttle flap end cap 4.

Figure 2:
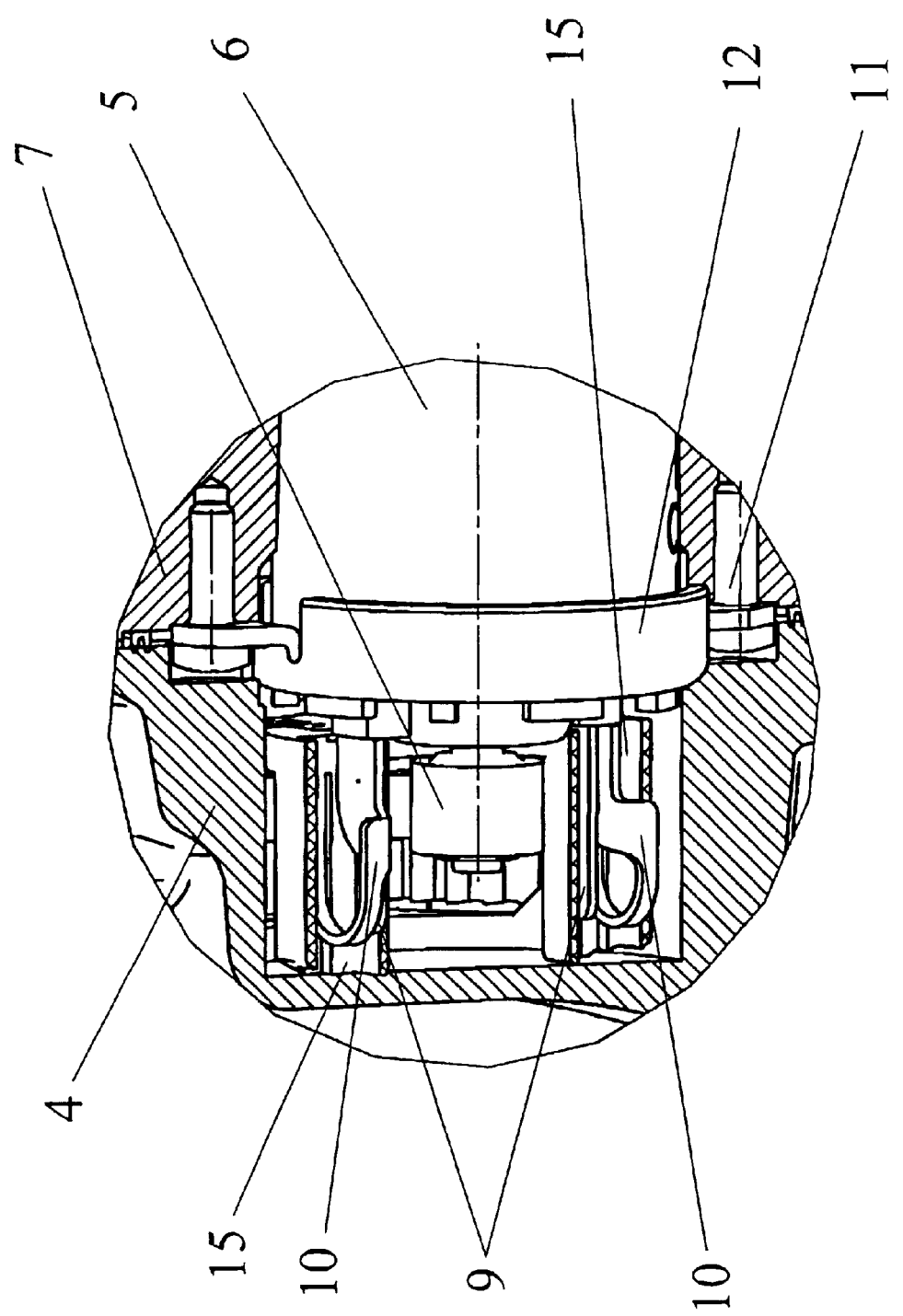
FIG. 2 is a partial section of the throttle flap adjustment unit of FIG. 1.

FIG. 2 shows, in enlarged section, the electrical contact of the contact elements 9 and the contact counterparts 10. An electrically secure connection can thus be advantageously realized, if the cover is exactly prepositioned with a defined axial distance from the throttle flap end cap 4. This preassembled state allows welding, soldering, etc., of the contact elements 9 of the servomotor 6 and the contact counterparts 10. In the subsequent final assembly of the still required exact axial positioning of the cover onto the throttle flap end cap 4, the contact elements 9, or, as in this embodiment only one contact element 9 is plastically deformed in an advantageously provided shaft 15. The contact elements 9 thereby function as so called "roll contacts". It should be made clear that the final assembly of a throttle flap adjustment unit according to the present invention is thereby substantially simplified, wherein a high degree of position fit of the servomotor and thereby also of the drive shaft 14 and of the pinion 5 are achieved with respect to the drive for adjusting the throttle flap shaft 2.

While the present invention has been illustrated by means of one or more referred embodiments, one of ordinary skill in the art will recognize that modifications, improvements, additions, deletions and substitutions can be made while remaining within the scope and spirit of the present invention, as defined by the appended claims.

What is claimed is:

1. A throttle flap adjustment unit, comprising:
   a. a throttle flap shaft;
   b. a throttle flap fastened to the throttle flap shaft;
   c. a throttle flap end cap in which the throttle flap shaft is rotatably journaled;
   d. a servomotor arranged to adjust the throttle flap shaft and coupled to the throttle flap shaft by a drive, and having a drive shaft and a front portion formed as an end plate;
   e. a sensor unit arranged to determine a position of the throttle flap shaft; and
   f. a cover fastened onto the throttle flap end cap;
   wherein the servomotor is positioned in the cover and is controllable by an electrical coupling element, and wherein the end plate is constructed to center the servomotor with respect to the throttle flap end cap, and center the servomotor in the cover.

2. A throttle flap adjustment unit according to claim 1, characterized in that the servomotor is positioned by means of contact elements.

3. A throttle flap adjustment unit according to claim 1, wherein the sensor unit is positioned in the throttle flap end cap, and wherein the end plate is provided with contact elements electrically connected with corresponding contact counterparts provided on the throttle flap end cap 4, so that an electrical connection is made between the servomotor and the sensor unit.

4. A throttle flap adjustment unit according to claim 3, wherein one or both of (1) the contact elements and (2) the contact counterparts are friction fit into a shaft and are plastically deformed following axial positioning of the cover with the throttle flap end cap.

5. A throttle flap adjustment unit according to claim 2, wherein said contact elements alternately position said servomotor at a pre-assembled state and at an assembled state.

* * * * *